United States Patent
Smith

(10) Patent No.: US 9,616,781 B2
(45) Date of Patent: Apr. 11, 2017

(54) ACID REFLUX CAR SEAT

(71) Applicant: Abigail N. Smith, Ravenswood, WV (US)

(72) Inventor: Abigail N. Smith, Ravenswood, WV (US)

(*) Notice: Subject to any disclaimer, the term of this patent is extended or adjusted under 35 U.S.C. 154(b) by 0 days.

(21) Appl. No.: 14/880,933

(22) Filed: Oct. 12, 2015

(65) Prior Publication Data

US 2016/0101713 A1     Apr. 14, 2016

Related U.S. Application Data

(60) Provisional application No. 62/063,585, filed on Oct. 14, 2014.

(51) Int. Cl.
    *B60N 2/28*    (2006.01)
    *B60N 2/68*    (2006.01)

(52) U.S. Cl.
    CPC ............ *B60N 2/28* (2013.01); *B60N 2/2812* (2013.01); *B60N 2/2821* (2013.01); *B60N 2/2845* (2013.01); *B60N 2/2875* (2013.01); *B60N 2/68* (2013.01); *B60N 2002/2815* (2013.01)

(58) Field of Classification Search
    CPC ...... B60N 2/28; B60N 2/2812; B60N 2/2821; B60N 2/2845; B60N 2/2875; B60N 2/68; B60N 2002/2815
See application file for complete search history.

(56) References Cited

U.S. PATENT DOCUMENTS

| | | | |
|---|---|---|---|
| 5,115,523 A | 5/1992 | Cone | |
| 5,134,733 A | 8/1992 | Wetter et al. | |
| 5,439,008 A * | 8/1995 | Bowman | A47D 13/08 128/845 |
| 6,058,529 A | 5/2000 | Goysich | |
| 6,205,600 B1 | 3/2001 | Sedlack | |
| 6,922,861 B1 * | 8/2005 | Mathis | A47D 13/08 5/425 |
| 6,931,683 B1 | 8/2005 | Elkin et al. | |
| 7,251,846 B1 * | 8/2007 | Elkin | A47D 13/08 128/875 |
| 8,082,614 B2 | 12/2011 | Nour | |
| 2012/0280540 A1 * | 11/2012 | Pedraza | B60N 2/2806 297/148 |
| 2014/0252828 A1 * | 9/2014 | Wang | B62J 1/162 297/256.15 |
| 2015/0183341 A1 * | 7/2015 | Carpenter | B60N 2/2821 297/256.16 |

* cited by examiner

*Primary Examiner* — Philip Gabler
(74) *Attorney, Agent, or Firm* — Dinsmore & Shohl LLP; Monika L. Jaensson, Esq.

(57) ABSTRACT

The disclosed technology is a car seat for infants suffering from acid reflux, embodiments of which include a car seat base or wedge frame and a removable rectangular frame. The removable rectangular frame has a flat child support surface, allowing the child to be secured to the removable rectangular frame. The wedge frame has a support structure along the interior thereof for supporting the removable rectangular frame within the wedge frame. The wedge frame and the removable rectangular base support the child support surface at an angle of about 30 degrees, or 28-32 degrees, or 20-40 degrees, relative to the wedge frame's bottom plane.

7 Claims, 4 Drawing Sheets

Figure 2A:
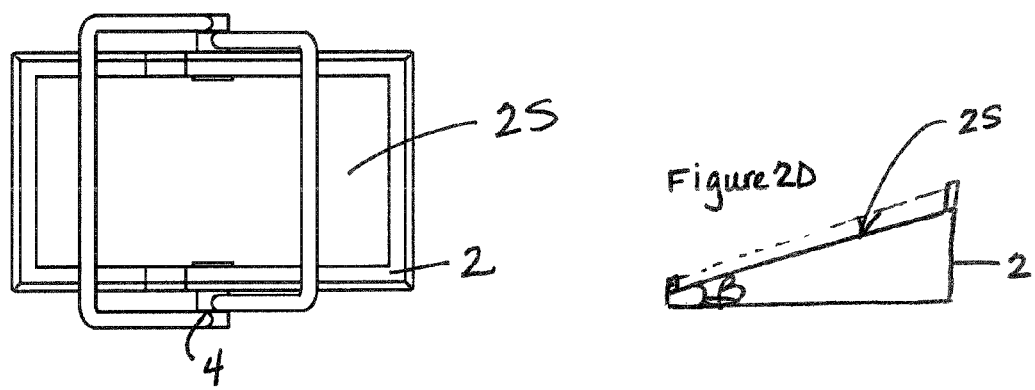
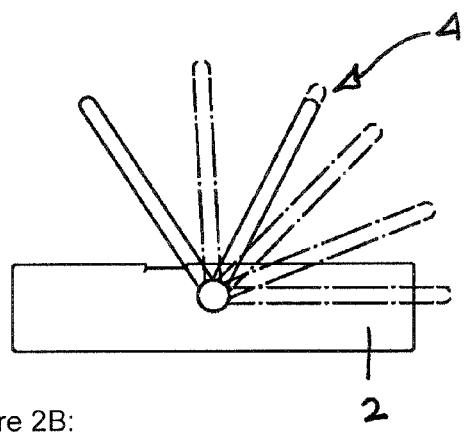
Figure 2B:
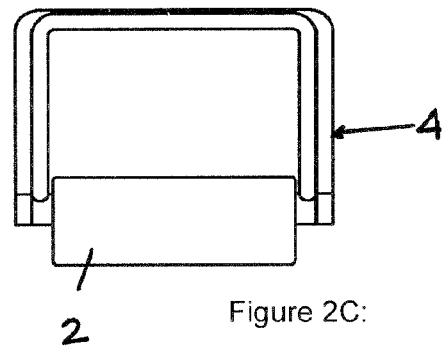
Figure 2C:

ACID REFLUX CAR SEAT

BACKGROUND

The present invention regards a car seat for infants and toddlers who suffer from acid reflux, wherein the infant is supported on and secured to a flat surface by means of the present invention, at an angle of about 30 degrees from horizontal.

Prior art car seats with or without removable carriers do not provide relief to children who suffer from acid reflux, and therefore are uncomfortable to them when traveling in a car or are carried in their carriers. The present invention is intended to allow children having this condition to be in a comfortable position when traveling in the carrier.

GENERAL DESCRIPTION

The disclosed technology is a car seat for infants with acid reflux, and in some embodiments includes a car seat base or wedge frame and a removable rectangular frame. The removable rectangular frame has a flat child support surface, allowing the child to be secured to the removable rectangular frame. The wedge frame has a support structure along the interior thereof for supporting the removable rectangular frame within the wedge frame. The wedge frame and the removable rectangular base support the child support surface at an angle of about 30 degrees, or 28-32 degrees, relative to the wedge frame's bottom plane.

The disclosed technology further eliminates pressure of the belt on the abdomen of the infant by having the affixation points at the hip, rather than at the abdomen as found in many prior art infant carriers and car seats. A plurality of horizontal support bars found in some embodiments of the present invention also provides the user additional stability when carrying the carrier apart from the base.

DESCRIPTION OF THE DRAWINGS

FIGS. 2A, 2B, 2C and 2D are top, side and back views of an embodiment of the removable rectangular frame of the disclosed technology.

DETAILED DESCRIPTION

The disclosed technology is a car seat specifically designed for infants and young children with acid reflux. In embodiments of the disclosed technology (as shown in FIGS. 1A-E) the car seat includes a wedge frame 1 and a removable rectangular frame 2 with a flat surface 2S to support and secure a child, wherein the removable rectangular frame is received by and positioned within the wedge frame so that the child support surface of the removable rectangular frame is at an angle of inclination $\alpha$ of 20-40 degrees relative to the bottom plane P of the wedge frame; in some embodiments the angle of inclination $\alpha$ is between 25-35 degrees, and in some embodiments between 28-32 degrees relative to the bottom plane of the wedge frame. The wedge frame is formed to include front and back ends 1A, 1B and right and left sides 1C, 1D, which ends and sides extend perpendicularly from the bottom plane of the wedge frame. In some embodiments of the disclosed technology the right and left sides of the wedge frame have a height increasing from the front end to the back end at an angle of 20-40 degrees, or 25-35 degrees, or 28-32 degrees; in these embodiments the front end 1A of the wedge frame has a height less than the height of the back end 1B corresponding to the height of the sides 1C, 1D at the points the sides join with the respective end.

Figure 1A:
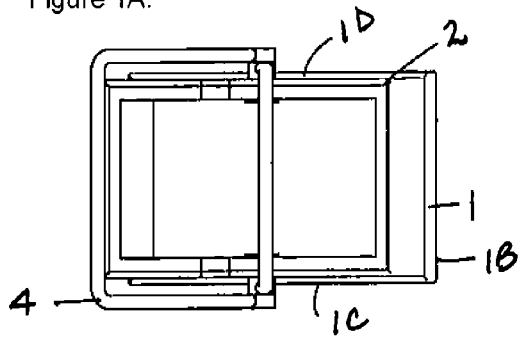
FIGS. 1A, 1B, 1C, 1D and 1E are perspective views of an embodiment of the disclosed technology.
Figure 1B:
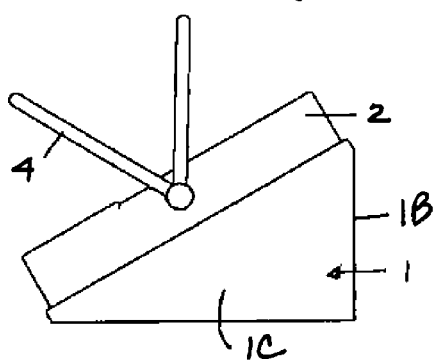
Figure 1C:
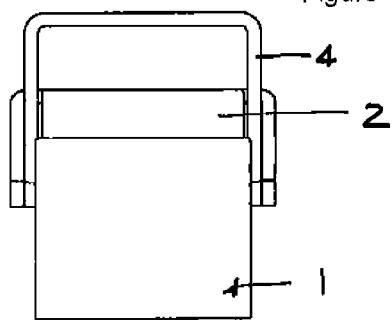
Figure 1D:
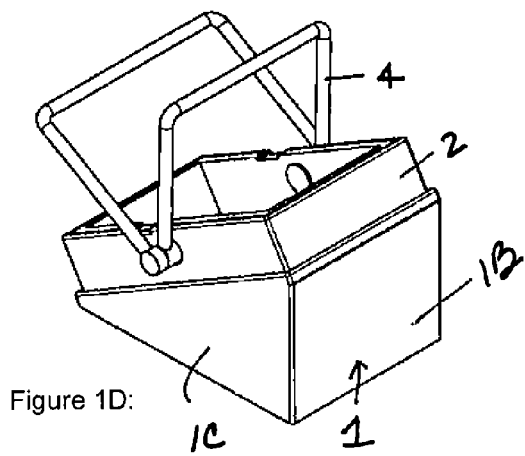
Figure 1E:
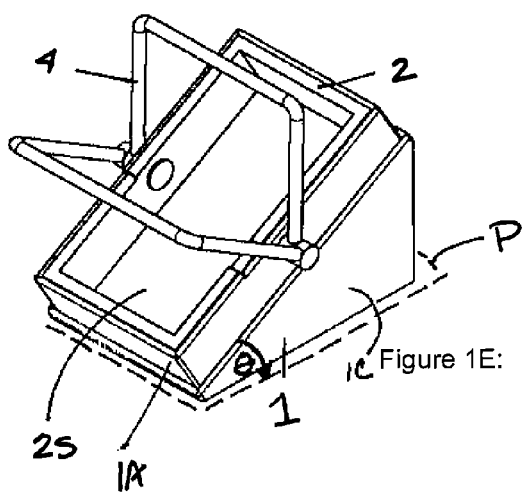
Figure 3A:
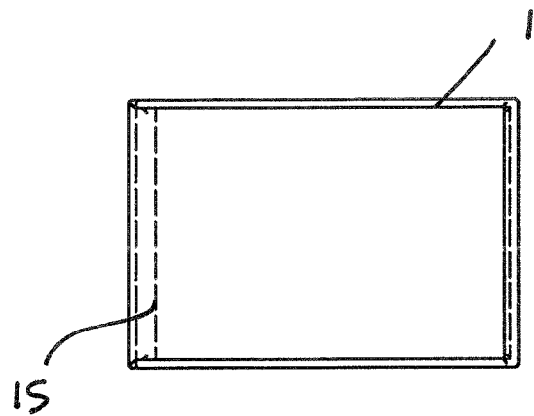
FIGS. 3A, 3B and 3C are side and top views of the wedge frame of the disclosed technology.
Figure 3B:
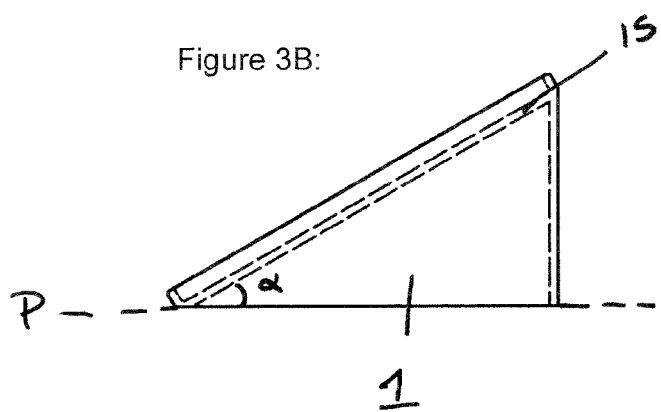
Figure 3C:
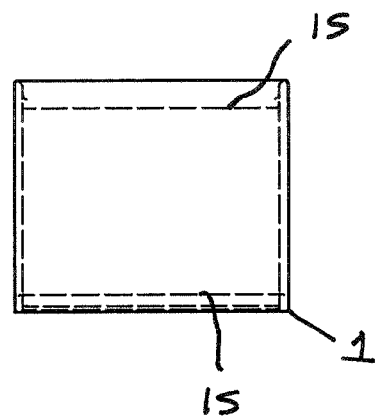

As shown in FIG. 3A-C, the wedge frame further includes a support structure 1S to support the removable rectangular frame. The support structure may be positioned on the interior surfaces of the sides of the wedge frame at an angle of inclination $\alpha$ of 20-40 degrees, or 23-35 degrees, or 28-32 degrees relative to the bottom plane P of the wedge frame. The angle of inclination of the support structure may be less than 20 degrees if the angle of inclination $\beta$ of the child support surface 2S of the removable rectangular frame relative to the plane of the base of the removable rectangular frame is greater than zero, as hereinafter described.

The support structure 1S may be affixed to the opposing interior side surfaces of the wedge frame, or the opposing ends of the frame, or both. The support structure may be structure protruding from the side/end into the interior of the wedge frame a sufficient distance (e.g., ½") to support the removable rectangular frame 2 within the wedge frame 1. The support structure 2S may also be a support surface affixed to all sides of the interior of the wedge frame. In some embodiments the support structure is positioned about ½" below the top edge of the sides of the support wedge.

As shown in FIGS. 2A-D, the removable rectangular frame 2 is sized and configured to be received within the wedge frame 1 and supported by the support structure 1S of the wedge frame. The support structure of the wedge frame may support perimeter portions of the removable rectangular frame, or the entire base of the removable rectangular frame. A latch mechanism may be incorporated on the underside of the rectangular frame and a corresponding portion of the wedge frame to removably secure the rectangular frame to the wedge frame. Latch mechanisms suitable for securing an infant carrier to its base are known in the art, such as found on the Graco Snap 'N' Go car seats, and many of such mechanisms are suitable for use in the present invention. A small notch may be provided near the lower third of the right and left top sides of the removable rectangular frame to secure a car lap belt over the seat when the vehicle is not L.A.T.C.H. equipped. The interior surfaces of the rectangular frame may be covered in expanded polystyrene.

In some embodiments of the described technology the child support surface 2S of the removable rectangular frame is positioned within such frame at an angle of 0-32 degrees, whereby the sum $\theta$ of (i) the angle $\beta$ of the child support surface of the removable rectangular frame relative to the plane of the bottom of the rectangular frame and (ii) the angle $\alpha$ of the support structure of the wedge frame relative to the bottom plane of the wedge frame, when the removable rectangular frame is positioned within the wedge frame, is between 20-40 degrees, or 25-35 degrees, or 28-32 degrees.

Figure 4:
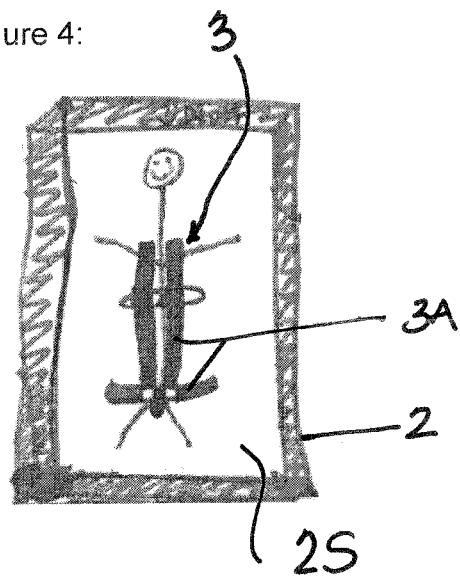
FIG. 4 is a top view of a child secured in an embodiment of the disclosed technology.
Figure 5:
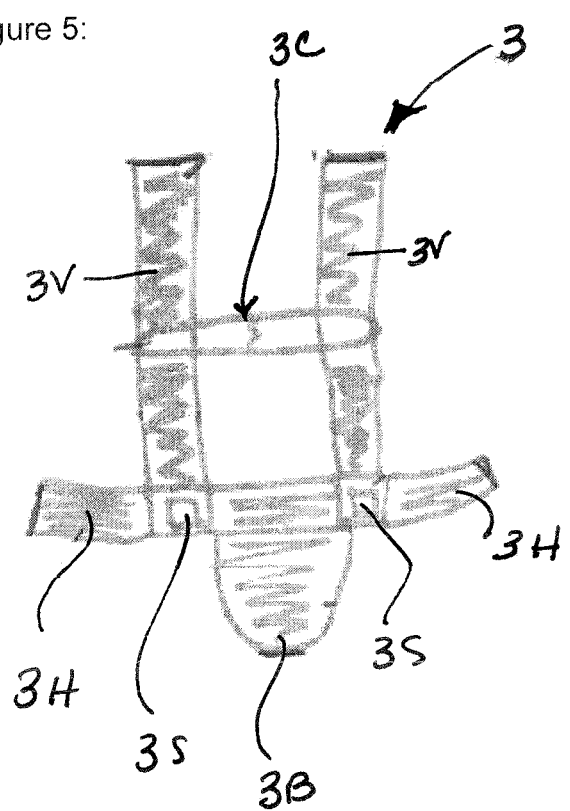
FIG. 5 is a top view of an embodiment of the child securing means of the disclosed technology.

As shown in FIGS. 4 and 5, the infant car sear of the described technology further includes adjustable child securing means 3 for securing the infant to the child support surface 2S of the rectangular frame 2. In some embodiments the child securing means includes a plurality of exposed straps 3A extending through apertures in the seat and adjustably secured to the underside of the rectangular base by means of rollers and metal loops, controlled by a push button on a spring release (all as known in the art). The straps may be secured to the rectangular frame by other means used in the art to secure straps or other child securing means in an infant carrier. The exposed length of the straps may be adjusted by means of the adjustable securing means to accommodate different sized infants. The child securing means may be affixed to the removable rectangular frame at several different locations.

In some embodiments the straps may be positioned both vertically and horizontally over the child support surface so that a pair of vertical straps 3V form opposing shoulder straps for the infant, which may be removably and adjustably securable to each other by means of a paperclip chest clasp 3C engaged along the vertical straps. When an infant is positioned within the seat, the chest clasp should be adjusted so that it is positioned at the infant's chest. One or more horizontal straps 3H of the child securing system may form a lap belt, with one or more hip clip systems 3S movably positioned on the horizontal straps, at or about one or both of the hips of an infant when the infant is positioned in the seat. Suitable hip clip systems 3S for the child securing system of the present technology include child-size seat belts, such as rectangular seat belts with a clip on one side, and a receiving means with a pressure button on the other, to receive and secure, and to allow release of, the clip. A crotch belt 3B may be affixed to the center of the lap belt 3H, and be adjustably secured to the underside of the removable rectangular frame.

As shown in FIGS. 1A-E and 2A-C, the removable rectangular frame 2 may further include a carrying support system 4 affixed to opposing sides of the removable rectangular frame. The carrying support system may include a pair of arm support bars rotatably affixed to opposing sides of the rectangular base, using known or hereinafter developed methods and technology. Soft, flame retardant foam grip pads may be affixed around a central segment of the circumferential surface of each horizontal bar.

In embodiments of the disclosed technology the wedge frame, the rectangular frame, the support bars and other rigid components may be constructed from polypropylene plastic or other suitable materials. To increase the strength of the wedge frame without significantly increasing the weight thereof, the portion of the base below the support structure may be hollow or honeycombed, or may have any similar structure that supports the integrity of the wedge frame, but adds limited weight to the product. Exposed edges of both the wedge frame and the removable rectangular frame may be rounded.

The wedge frame of the disclosed technology also includes a latching mechanism (not shown) designed and configured to engage with a vehicle seat belt, allowing and securing the wedge frame to a vehicle; latching mechanisms for this purpose are known in the art.

In embodiments of the disclosed technology the removable rectangular frame may include a fabric covering, lining the interior of the removable rectangular frame and extending over the sides of the rectangular frame. The fabric covering may include flame-retardant padding, covered in fabric. The fabric covering may be removably secured to the removable rectangular frame by means of elastic bands positioned about the fabric covering to allow the bands to be stretched and secured about hooklets secured to and positioned about the exterior of the removable rectangular frame. In some embodiments of the disclosed technology the hooklets are positioned about the exterior of the removable rectangular frame about ½-¾" from the top of the frame.

Components of the disclosed technology may be described independently herein, but molded together as a single unit when manufacturing systems derived from the present invention. Furthermore, the present invention is described by various embodiments of the disclosed technology, which are not intended to limit the invention as claimed in the following claims.

The invention claimed is:

1. A car seat for infants with acid reflux, comprising a wedge frame and a removable rectangular frame having a child support surface,
    wherein the wedge frame comprises a pair of sides and a front and a back end, each side and end of the wedge having a top edge to form a top plane, and a bottom edge to form a bottom plane,
    wherein the wedge frame further comprises a support structure for supporting the removable rectangular frame within the wedge frame,
    wherein the support structure is positioned within the wedge frame below the top edge of the sides of the wedge frame, and
    wherein the child support surface is at an angle of 20-40 degrees relative to the wedge frame's bottom plane.

2. The car seat of claim 1, wherein the support structure extends at an angle of 28-32 degrees relative to the wedge frame's bottom plane.

3. The car seat of claim 2, wherein the sides of the wedge frame have a height that increases from the front to the back ends of the wedge frame at an angle of between about 20-40 degrees relative to the wedge frame's bottom plane.

4. The car seat of claim 1, wherein the child support surface is positioned within the removable rectangular frame at an angle of 28-32 degrees relative to the removable rectangular frame's bottom plane.

5. The car seat of claim 1, wherein the support structure is a surface extending across the interior of the wedge frame, below the top plane of the wedge frame, from one side to the other and from one end to the other.

6. The car seat of claim 1, further comprising child securing means comprising a pair of adjustable vertical straps, a lap belt and a crotch belt, wherein the securing means is secured to the removable rectangular frame, and wherein the adjustable vertical straps are removably secured to the lap belt.

7. The car seat of claim 1, wherein the removable rectangular frame further comprises a carrying support system affixed to opposing sides of the removable rectangular frame.

* * * * *